United States Patent
Kukuk et al.

(10) Patent No.: US 10,582,652 B2
(45) Date of Patent: *Mar. 10, 2020

(54) HYDRAULIC CONTROL SYSTEM

(71) Applicant: The Charles Machine Works, Inc., Perry, OK (US)

(72) Inventors: Brant Douglas Kukuk, Perry, OK (US); Cody L. Sewell, Perry, OK (US)

(73) Assignee: The Charles Machines Works, Inc., Perry, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/161,295

(22) Filed: Oct. 16, 2018

(65) Prior Publication Data

US 2019/0069468 A1 Mar. 7, 2019

Related U.S. Application Data

(63) Continuation-in-part of application No. 15/341,298, filed on Nov. 2, 2016, now Pat. No. 10,114,404.

(Continued)

(51) Int. Cl.
*A01B 63/10* (2006.01)
*A01D 34/64* (2006.01)
(Continued)

(52) U.S. Cl.
CPC .............. *A01B 63/10* (2013.01); *E02F 3/088* (2013.01); *E02F 5/06* (2013.01); *E02F 9/166* (2013.01);
(Continued)

(58) Field of Classification Search
CPC ........ A01D 34/64; A01D 34/82; A01D 34/74; A01D 69/03; A01D 75/20; A01D 63/10;
(Continued)

(56) References Cited

U.S. PATENT DOCUMENTS 3,385,376 A 5/1968 Hobhouse
3,547,216 A 12/1970 Marie
(Continued)

FOREIGN PATENT DOCUMENTS

DE 2137693 A 2/1973
DE 2315077 A 10/1974
(Continued)

*Primary Examiner* — Robert E Pezzuto
(74) *Attorney, Agent, or Firm* — Tomlinson McKinstry, P.C.

(57) ABSTRACT

A hydraulic control for an attachment on a work vehicle. Power is provided to the attachment by manually actuating a control that is biased toward a first position. This first position corresponds to a deactuated mode of the attachment. By unlocking a lock mechanism, the control may be maintained in a second position under hand pressure. This second position corresponds to an actuated mode of the attachment. The lock mechanism may be actuated by an operator platform-actuated release mechanism. While an operator is on a platform on the vehicle, the lock mechanism remains unlocked, and the attachment maintains its operation without hand pressure on the control. The release mechanism actuates the lock mechanism when an operator is not on the platform. As a result, the attachment is deactuated. A filter may be utilized to prevent premature actuation of the release mechanism.

19 Claims, 11 Drawing Sheets

Related U.S. Application Data

(60) Provisional application No. 62/249,561, filed on Nov. 2, 2015.

(51) Int. Cl.
| | | |
|---|---|---|
| *E02F 9/20* | (2006.01) | |
| *E02F 9/22* | (2006.01) | |
| *E02F 9/16* | (2006.01) | |
| *E02F 3/08* | (2006.01) | |
| *E02F 5/06* | (2006.01) | |
| *E02F 3/96* | (2006.01) | |

(52) U.S. Cl.
CPC .......... *E02F 9/2004* (2013.01); *E02F 9/2037* (2013.01); *E02F 9/22* (2013.01); *E02F 9/226* (2013.01); *E02F 3/964* (2013.01)

(58) Field of Classification Search
CPC . B62D 51/02; B62D 55/08; E02F 5/06; E02F 9/2004; E02F 9/226; E02F 9/166; E02F 9/2037; E02F 9/22; E02F 3/08; F15B 13/06; F16P 3/00; G05G 5/005; G05G 1/04; G05G 5/26; A01B 63/10
USPC ....... 56/14.7, 14.9, 15.4, 15.9, 16.7; 37/347, 37/348; 172/2–11, 257, 329, 433; 180/19.1–19.3, 6.2, 6.3, 6.32, 6.58; 280/32.7, 32.5, 35.5, 163; 414/523, 528
See application file for complete search history.

(56) References Cited

U.S. PATENT DOCUMENTS

| | | | |
|---|---|---|---|
| 3,708,031 A | 1/1973 | Janie et al. | |
| 4,165,789 A | 8/1979 | Rogers | |
| 4,400,935 A | 8/1983 | Louis | |
| 4,430,846 A | 2/1984 | Presley et al. | |
| 4,510,963 A | 4/1985 | Presley et al. | |
| 4,913,251 A | 4/1990 | Farr | |
| 5,147,010 A | 9/1992 | Olson et al. | |
| 5,151,634 A | 11/1992 | Ichihara et al. | |
| 5,348,115 A | 9/1994 | Devier et al. | |
| 5,509,220 A | 4/1996 | Cooper | |
| 5,544,055 A | 8/1996 | Cooper | |
| 5,553,407 A | 9/1996 | Stump | |
| 5,564,455 A | 10/1996 | Keating et al. | |
| 5,574,642 A | 11/1996 | Cooper | |
| 5,590,041 A | 12/1996 | Cooper | |
| 5,649,985 A | 8/1997 | Stump | |
| 5,704,142 A | 1/1998 | Stump | |
| 5,713,422 A | 2/1998 | Dhindsa | |
| 5,746,278 A | 5/1998 | Bischel et al. | |
| 5,768,811 A | 6/1998 | Cooper | |
| 5,893,425 A | 4/1999 | Finkle | |
| 5,913,371 A | 6/1999 | Jenne | |
| 5,944,121 A | 8/1999 | Bischel et al. | |
| 5,961,252 A | 10/1999 | Mercer et al. | |
| 6,079,506 A | 6/2000 | Mercer | |
| 6,119,376 A | 9/2000 | Stump | |
| 6,195,922 B1 | 3/2001 | Stump | |
| 6,226,588 B1 | 5/2001 | Teramura et al. | |
| 6,237,711 B1 | 5/2001 | Hunt | |
| 6,256,574 B1 | 7/2001 | Prestl et al. | |
| 6,354,023 B1 | 3/2002 | Trahan et al. | |
| 6,357,537 B1 | 3/2002 | Runquist et al. | |
| 6,408,952 B1 | 6/2002 | Brand et al. | |
| 6,408,960 B1 | 6/2002 | Hidaka et al. | |
| 6,477,795 B1 | 11/2002 | Stump | |
| 7,980,569 B2 | 7/2011 | Azure et al. | |
| 8,141,886 B1 | 3/2012 | Sugden et al. | |
| 8,561,382 B2 | 10/2013 | Gamble et al. | |
| 9,066,468 B2 | 6/2015 | Zwieg et al. | |

FOREIGN PATENT DOCUMENTS

| | | |
|---|---|---|
| DE | 3513750 A1 | 10/1986 |
| EP | 0721052 A2 | 7/1996 |
| GB | 2335450 A | 9/1999 |
| WO | 88/02435 A | 4/1988 |
| WO | 98/16712 A | 4/1998 |
| WO | 00/66386 A | 11/2000 |

HYDRAULIC CONTROL SYSTEM

FIELD

This invention relates generally to a system for controlling continuous operation of an attachment.

SUMMARY

The invention is directed to a work machine. The work machine comprises a chassis, a work attachment disposed on a first end of the chassis, and a work machine control system. The work machine control system comprises a control member, a lock, a release mechanism and a platform. The control member is movable from a first position to a second position. Moving the control member into the second position actuates the work attachment. The lock has a first condition and a second condition. The lock allows the control member to freely return to the first position when in the first condition. The lock maintains the actuation of the work attachment caused by the control member when the lock is in the second condition. The release mechanism is configured to place the lock in the first condition. The platform is movable from a first position to a second position. The platform is disposed at a second end of the chassis. The platform is movable from a first platform position to a second platform position. The platform contacts the release mechanism in the first platform position and does not contact the release mechanism in the second platform position. The release mechanism places the lock in the first condition when the platform is in the first platform position.

DETAILED DESCRIPTION

Figure 1:
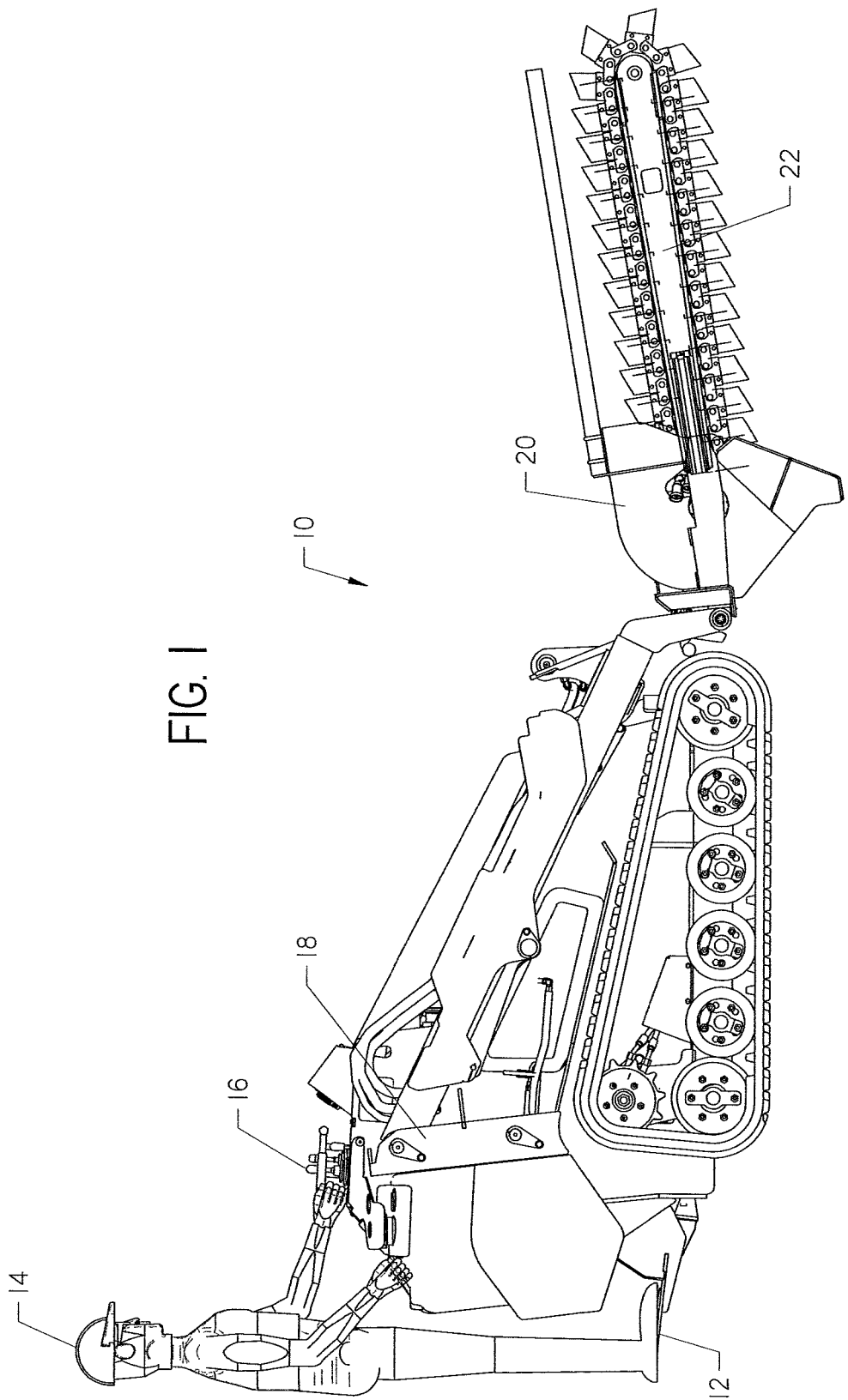
FIG. 1 is a side view of a trencher having an operator platform.
Figure 2:
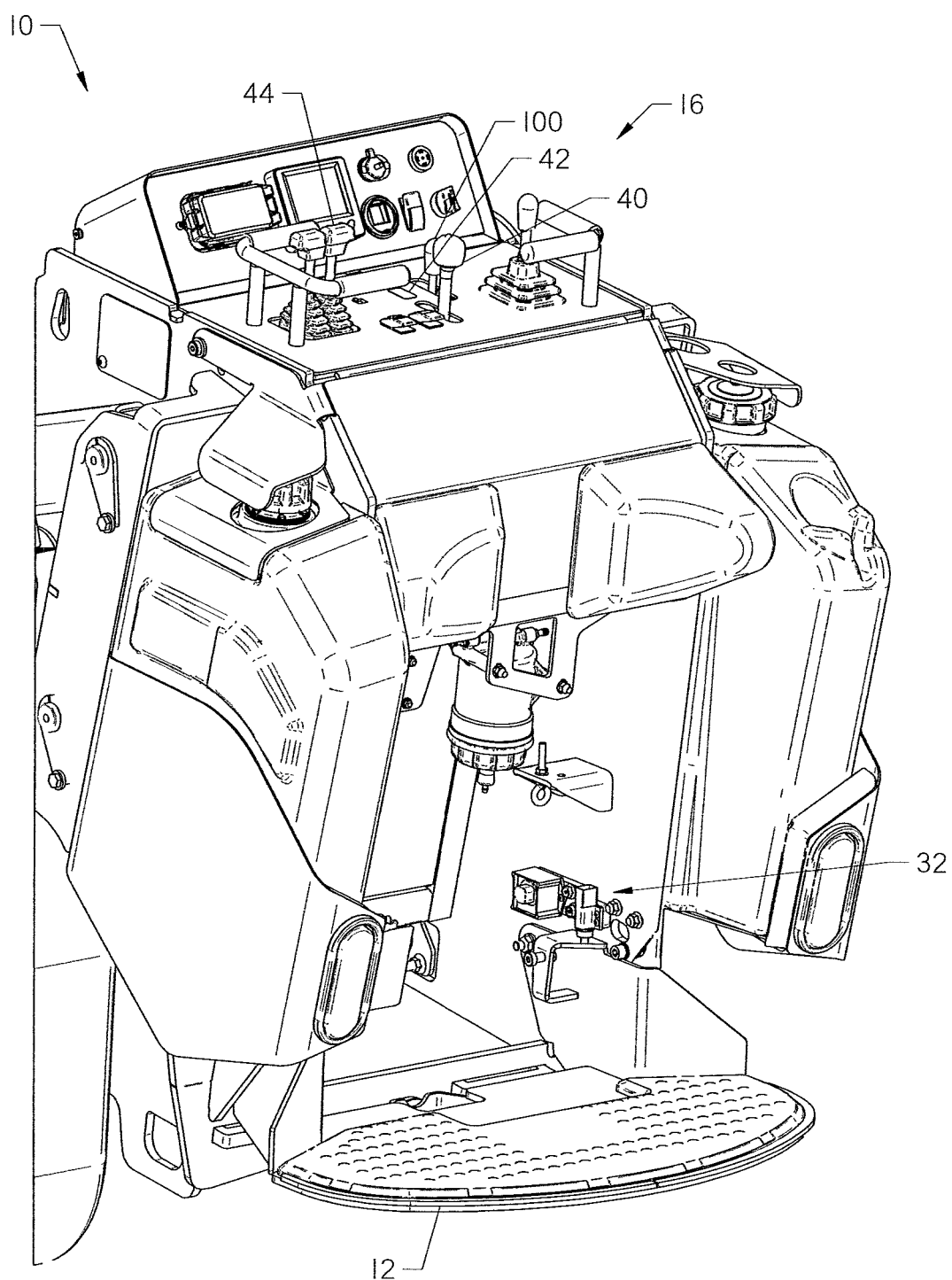
FIG. 2 is a back left perspective view of an operator station for a work machine.

With reference to FIG. 1, a work vehicle 10 with an operator platform 12 is shown. An operator 14 is shown standing on the operator platform 12 at a control panel 16. The operator platform 12 generally extends from the work vehicle 10 a length of twelve to thirty-six inches, and is approximately the width of the work vehicle 10. The platform 12 may have tread or friction increasing-material on an upper surface to prevent slippage by the operator 14.

The work vehicle 10 comprises a chassis 18 and an attachment 20. As shown, the operator platform 12 is on an opposite end of the chassis 18 from the attachment 20. The attachment 20 shown is a trencher 22. Other attachments, such as vibratory plows, buckets, microtrenching assemblies, grapple arms, excavator arms, stump grinders, and the like may be utilized with the chassis 18.

When the attachment 20 such as trencher 22 is active, it rotates about the trencher boom to uncover a trench. The operator 14 should stay away from the trencher 22 to avoid serious injury. The same is true for other attachments 20, which may rotate or impart loads during a construction operation that would be hazardous to an operator 14.

Figure 10:
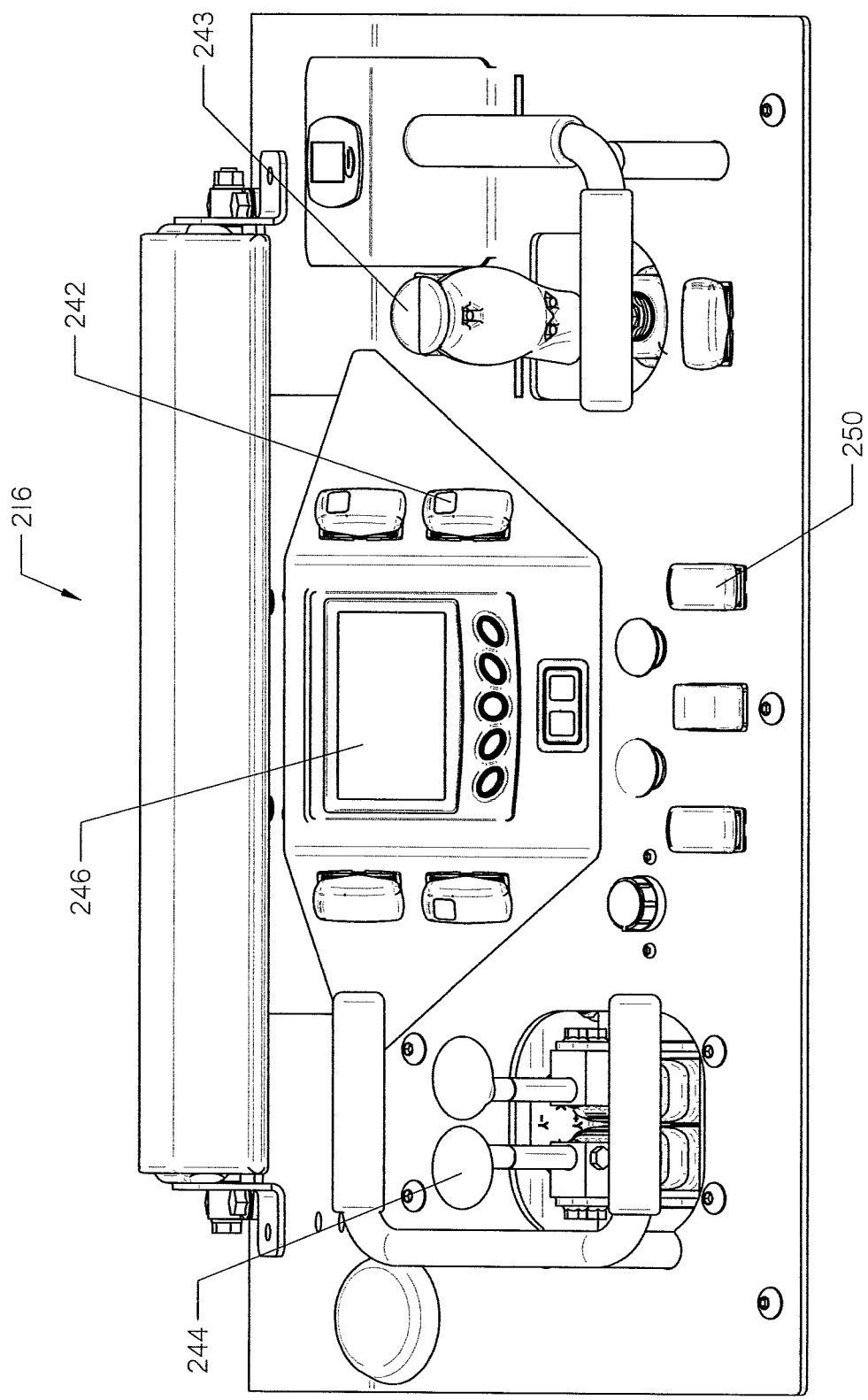
FIG. 10 is a top view of an alternative control panel for use with the work machine.
Figure 11:
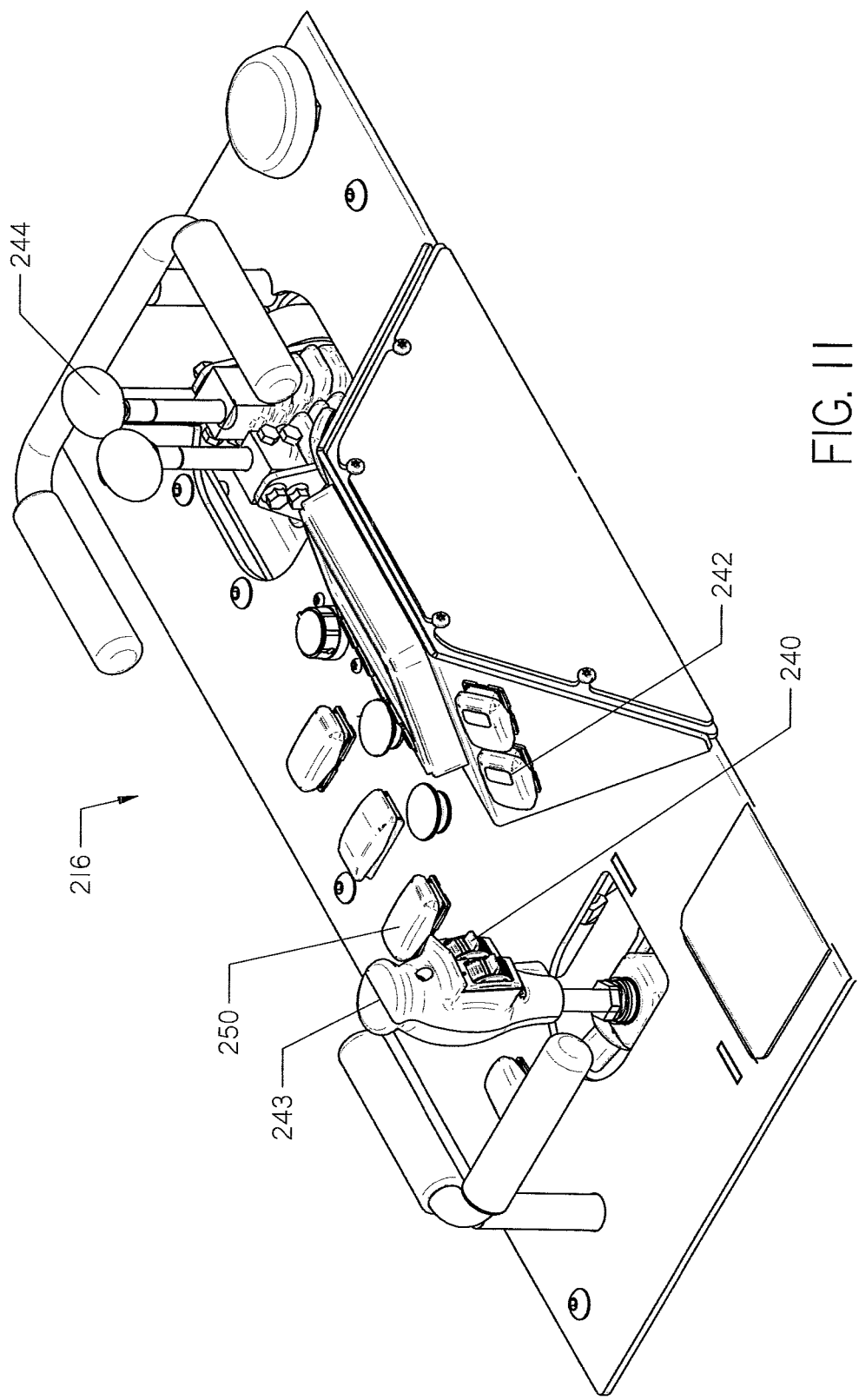
FIG. 11 is a back view of the control panel of FIG. 10.

With reference now to FIGS. 2-6, a system for detecting operator 14 presence on the operator platform 12 is shown. The system comprises a release mechanism 32, the control panel 16 and the operator platform 12. As shown in detail on FIG. 6, the control panel 16 comprises an attachment operation lever 40, a lock switch 42 and a hydraulic flow lever 100. Other controls 44 and displays 46 may be used to perform and observe functions of the work vehicle 10, such as operation of lift arms, tracks, etc. As shown, the operation lever 40 and hydraulic flow lever 100 are joysticks, though other controls may be utilized, as shown in FIGS. 10 and 11.

The operation lever 40, when actuated under hand pressure, causes the attachment 20 to operate. The lever 40 has a first actuation position, generally when the lever is moved forward, and a second neutral position. When in the neutral position, the attachment 20 does not operate. Attachment 20 operation may be rotation of the trencher 22 chain, vibration of a plow, rotation of a stump grinder, or other primary function of the attachment 20. The operation lever 40 may be bidirectional, such that the lever 40 may cause forward and reverse operation of the attachment 20. Alternatively, the operation lever 40 may be actuated in a single direction only. In either case, it is preferable for the operation lever 40 to bias back to neutral when not actuated under hand pressure by the operator 14.

The lock switch 42 has a first position and a second position. In the first position, the operation lever 40 returns to neutral position when not actively held by the operator 14. When the lock switch 42 is in the second position, the operation lever 40 remains in an actuated position until returned to a neutral position. Thus, the attachment 20 continues to operate even when the operator is not actively holding the operation lever 40.

One or more detent mechanisms may be used to hold the operation lever 40 in the actuated position. Exemplar detent mechanisms include retractable pins, latches, grippers, magnets, and the like. The detent mechanism may engage the operation lever 40 at any point along its length to hold it into place, may engage a connection feature (not shown), or otherwise restrict the return of the lever to neutral.

When the lock switch 42 is in the second position and the detent mechanism is holding the operation lever 40, the operator 14 is free to operate other features of the work machine 10 with the knowledge that the attachment 20 will continue in a "cruise control" mode.

Figure 3:
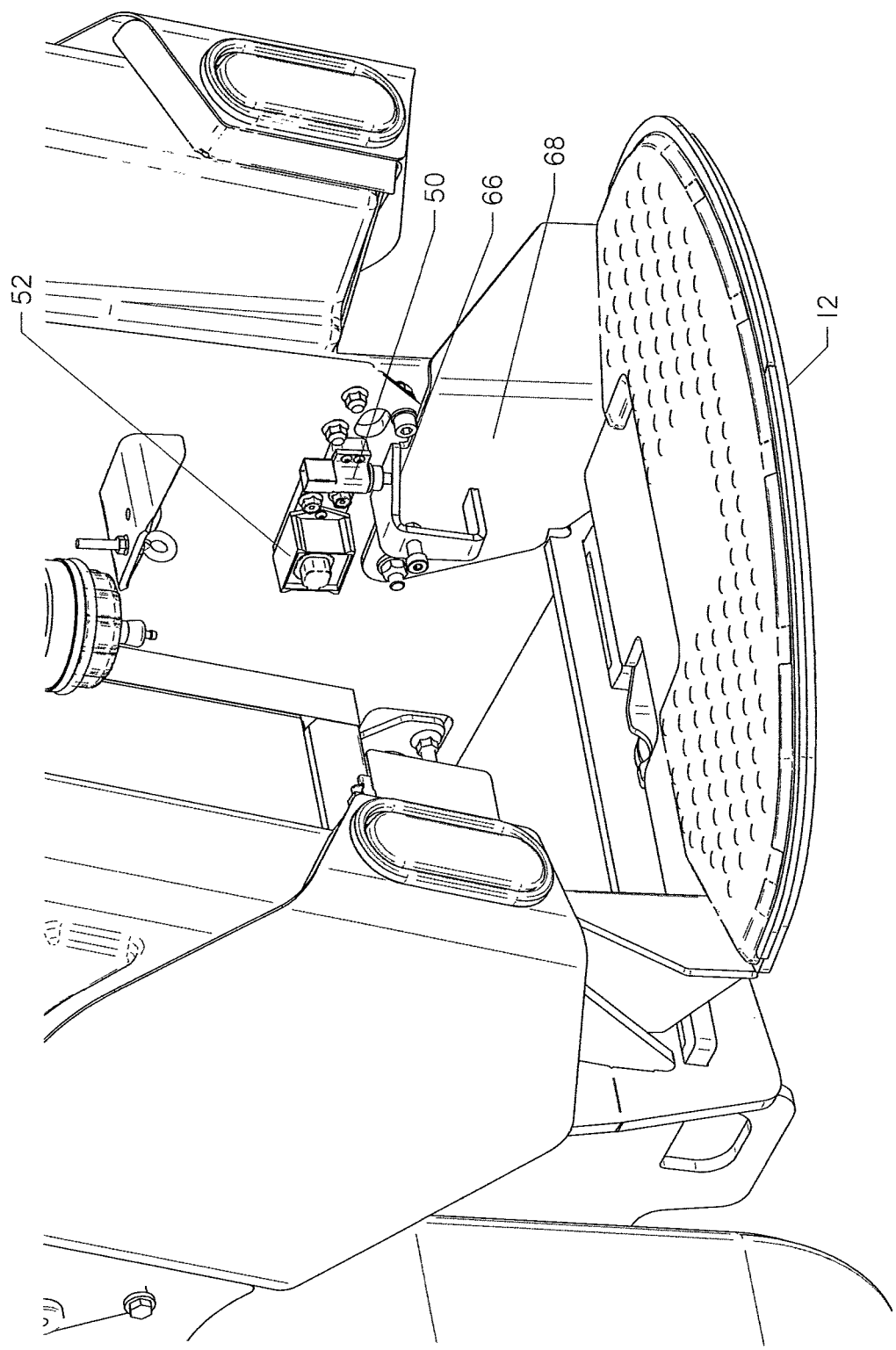
FIG. 3 is a back left perspective view of the operator station of FIG. 2.
Figure 4:
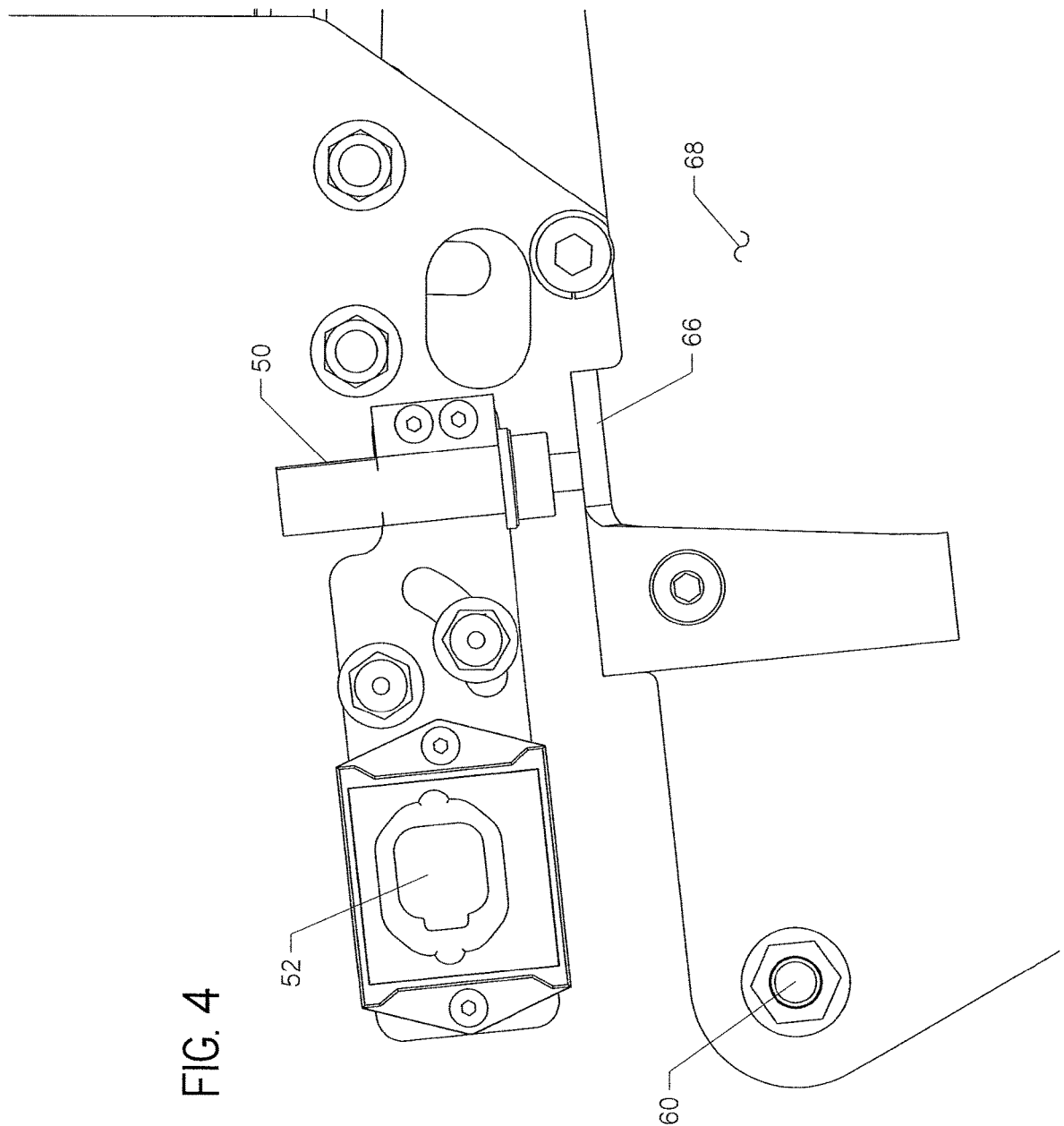
FIG. 4 is a side view of a release mechanism for use with a work machine.
Figure 5:
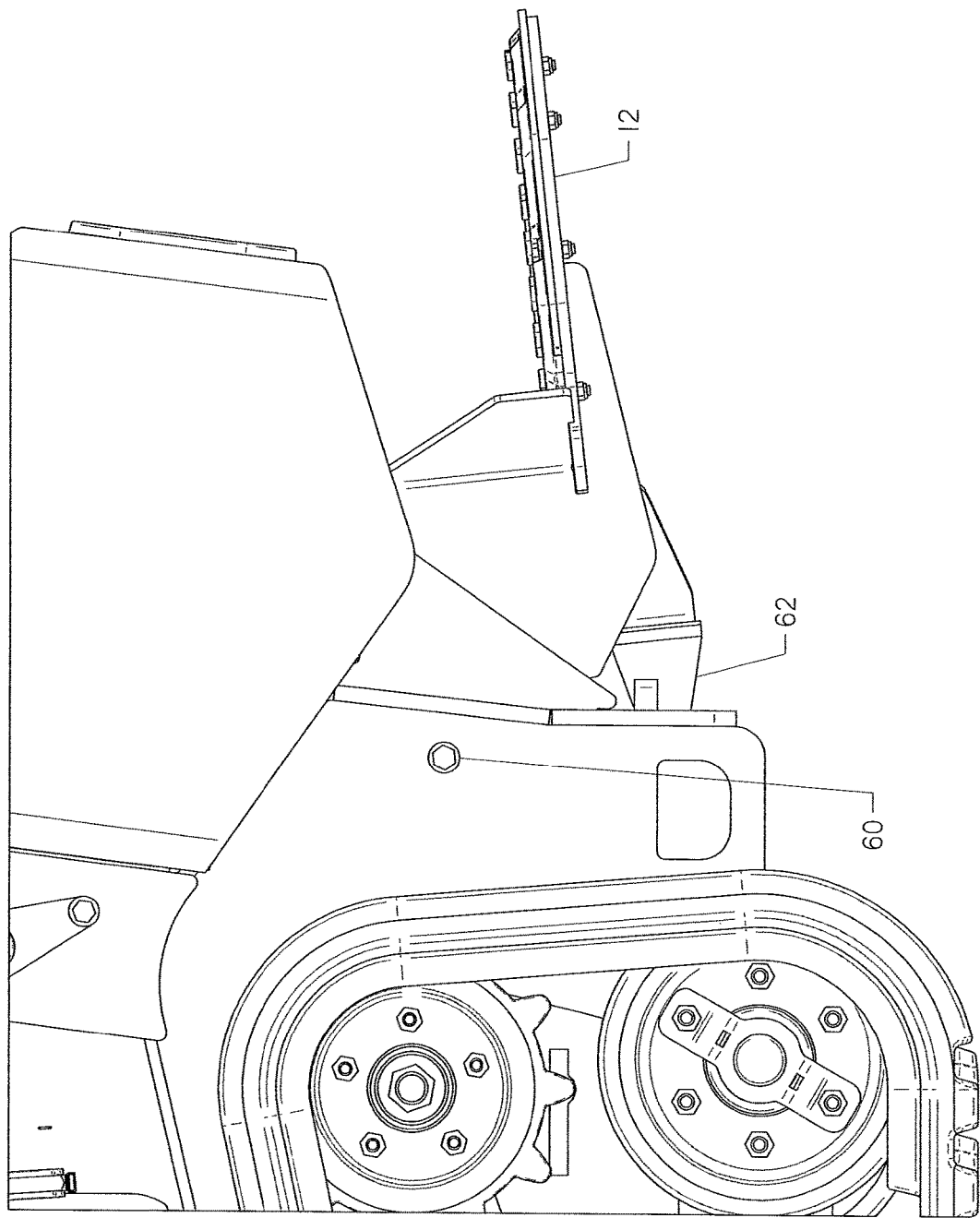
FIG. 5 is a side view of a platform for use with a work machine.

The release mechanism 32 comprises a detection switch 50 and a filter 52, as shown with more detail in FIG. 3. With reference to FIGS. 4 and 5, the platform 12 is attached to the chassis 18 at a pivot 60 and is biased in a first position by a spring 62. The pivot 60 may comprise two bolts disposed at separate side walls 68 of the platform.

The spring 62 is preferably made of rubber. The spring 62 extends between the platform 12 and the chassis 18. The spring 62 may be fixed to the platform 12. As a distal end of the platform 12 will tend to rotate down relative to pivot 60, placement of the spring 62 below the pivot 60 will provide the spring to contact the chassis. Alternatively, the spring 62 may be fixed to the chassis 18 in a similar position.

The spring 62 deforms when the weight of the operator 14 is applied to the platform 12. As shown, the spring 62 compresses. This compression allows the platform 12 to move from a first position to a second position. Without the application of the operator 14 weight, the spring 62 will bias the platform 12 to the first position.

Side walls 68 are formed on each side of the platform 12. The side walls 68 further comprise a tab 66 or other contact structure. The tab 66 is shown integrally formed with the platform 12 on a side wall 68. Thus, the tab 66, side wall 68, and platform 12 each rotate about pivot 60, as restricted by compression of the spring 62.

When the platform 12 is in the first position, the platform's rotation about pivot 60 causes the tab 66 to contact the detection switch 50 of the release mechanism 32. Thus, the tab 66 indicates the presence of an operator 14 on the platform 12. When an operator 14 is on the platform 12 and the platform is in the second position, the tab 66 is rotated down and away from the detection switch 50.

While a tab 66 is disclosed herein, contact with the detection switch 50 may be made by an edge of the side wall 68. Additionally, the tab 66 may be configured such that it contacts the detection switch 50 of the release mechanism 32 when the platform is in the second position. In this mode, the tab 66 indicates the presence, rather than the absence, of the operator 14 on the platform 12.

The detection switch 50 may be a mechanical plunger or switch, or may detect the proximity of the tab 66 using electrical impedance or optical methods. The release mechanism 32 generates a signal when the tab 66 actuates the detection switch 50. Preferably, the release mechanism 32 generates a signal when the platform 12 is in the first position, indicating the operator 14 is not on the platform.

When the detection switch 50 is actuated by the tab, the filter 52 begins to run for a predetermined time. The filter 52 restricts transmission of the signal until it has persisted for a predetermined time. In this way, the filter 52 prevents false signals from reaching the control panel 16. Once the predetermined time has been reached, the signal is allowed to be sent from the release mechanism 32 to the control panel 16. If the detection switch 50 indicates that the operator is back on the platform prior to expiration of the predetermined time, the signal is filtered by the filter 52 and is not sent by the release mechanism 32.

The signal may be an electrical current, movement of a mechanical structure, a wireless signal, or other mechanism. Further, the signal may comprise the absence, rather than the presence, of the above potential signals. For example, a current may be continuously generated from the release mechanism 32 and received at the control panel 16. In this scenario, expiration of the predetermined time with the tab 66 actuating the detection switch 50 interrupts the current. The interruption of the current is the signal received by the control panel 16 indicating that the platform is in the first position and thus, the operator 14 is not at the platform.

Filtering of false signals by the filter 52 is advantageous due to conditions which may cause the platform 12 to move to the first position with the operator 14 on the platform. Such false signals interrupt operation of the attachment 20. One such condition is a "bump" on the surface of the ground that causes the platform 12 to vertically oscillate. Preferably, the predetermined time is between one and four seconds. More preferably, the predetermined time is two seconds.

Transmission of the signal by the release mechanism 32 overrides the lock switch 42 and allows the operation lever 40 to return to neutral. This may occur by releasing the detent mechanism. Thus, the operation lever 40 may be placed in a detent condition when an operator 14 is on a platform 12. However, when the operator 14 leaves the platform 12 for the predetermined time, the operation lever 40 is released and return to neutral. With the operation lever 40 in neutral, the attachment 20 no longer operates.

With reference to FIGS. 10-11, an alternative control panel 216 is shown. The control panel 216 comprises a control lever 243 with a pair of hydraulic control switches 240. The control panel 216 further comprises other operational levers 244 and displays 246, as well as a lock switch 242 and flow switch 250. The other operational levers 244 may operate features such as the ground drive of the work vehicle 10.

As shown, the hydraulic control switches 240 are disposed on a back side of the control lever 243. Alternatively, the hydraulic control switches may be disposed on an operational lever 244 or elsewhere on the control panel 243. The control lever 243 may control a position of the attachment 20. For example, hydraulic cylinders may change an orientation of the attachment 20 or lift the same.

The hydraulic control switches 240 are used to cause the attachment 20 (FIG. 1) to operate. For example, the hydraulic control switches 240 may activate a vibratory plow or rotation of a trencher chain. Two hydraulic control switches 240 rather than one are used to allow for control of two such hydraulic features. Preferably, the hydraulic control switches 240 are rollers having an infinite number of positions, allowing the position of the switch relative to neutral and full to adjust the hydraulic power to the attachment 20.

The lock switch 242 has a first condition and a second condition. In the first condition, the hydraulic control switches 240 will return to a neutral position when not actively held by the operator 14, and the attachment 20 will cease operation.

When the lock switch 242 is in the second condition, the hydraulic control switches 240 will remain activated, causing operation of the attachment 20, if actuated past a predetermined point. The predetermined point may be 80% of the full range of the hydraulic control switch 240. The hydraulic control switch 240 may detent, or may return to neutral. In any case, the attachment 20 continues to operate with the lock switch 242 in the second position.

Operation of the attachment 20 will continue until 1) the lock switch 242 is moved to the first position, 2) the hydraulic control switch 240 is adjusted again, overriding the lock switch 242, or 3) the signal is transmitted by release mechanism 32 (FIG. 2), overriding the lock switch 242.

In order to re-activate the lock switch 242 after an override due to movement of the hydraulic control switch 240 or a signal from the release mechanism 32, it must be reset to the first position before being used in the second position.

Figure 6:
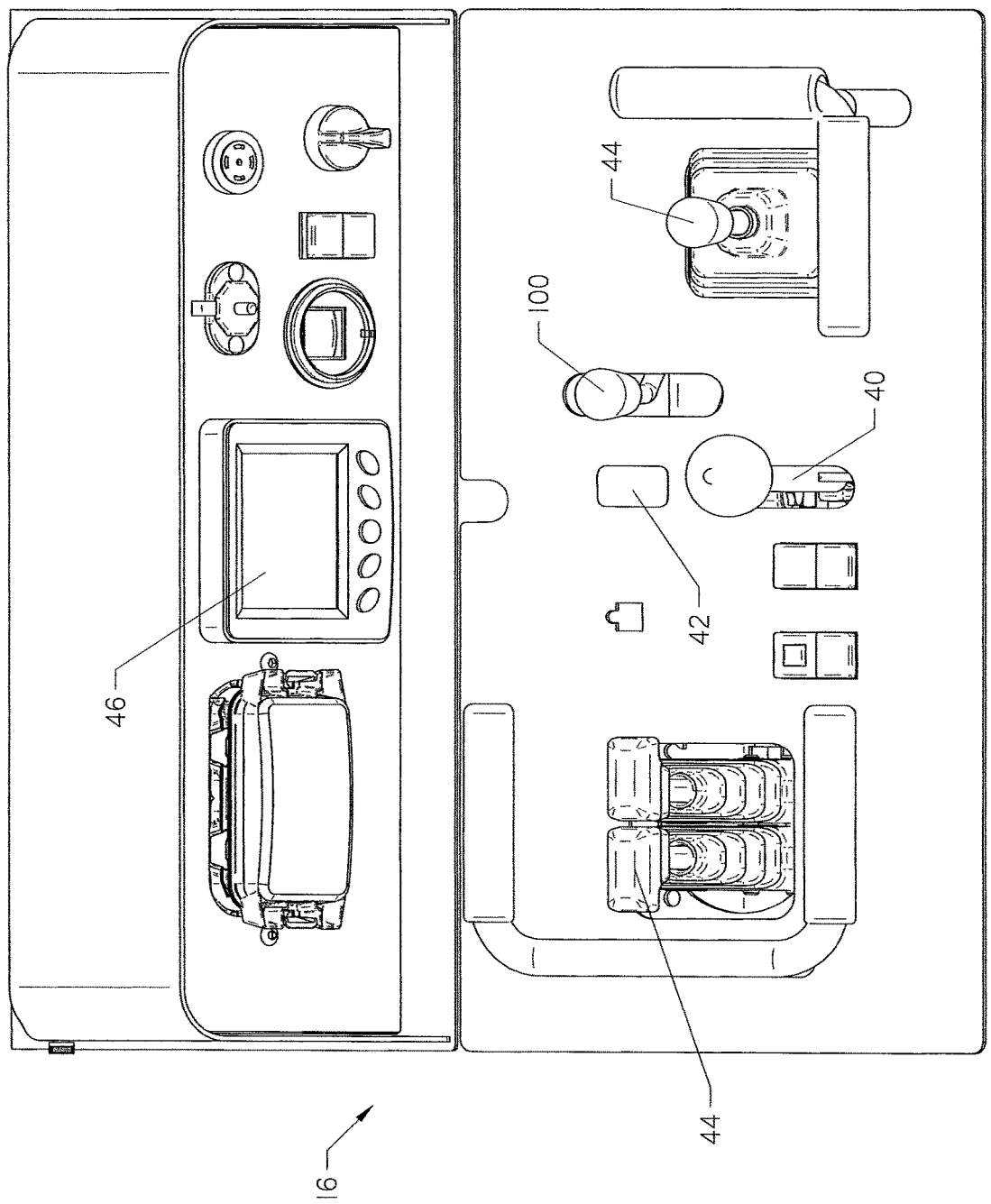
FIG. 6 is a top view of a control panel for use with the work machine of FIG. 2.

In the embodiment shown in FIGS. 10-11, the flow switch 250 is shown replacing the flow lever 100 of FIG. 6.

Figure 7:
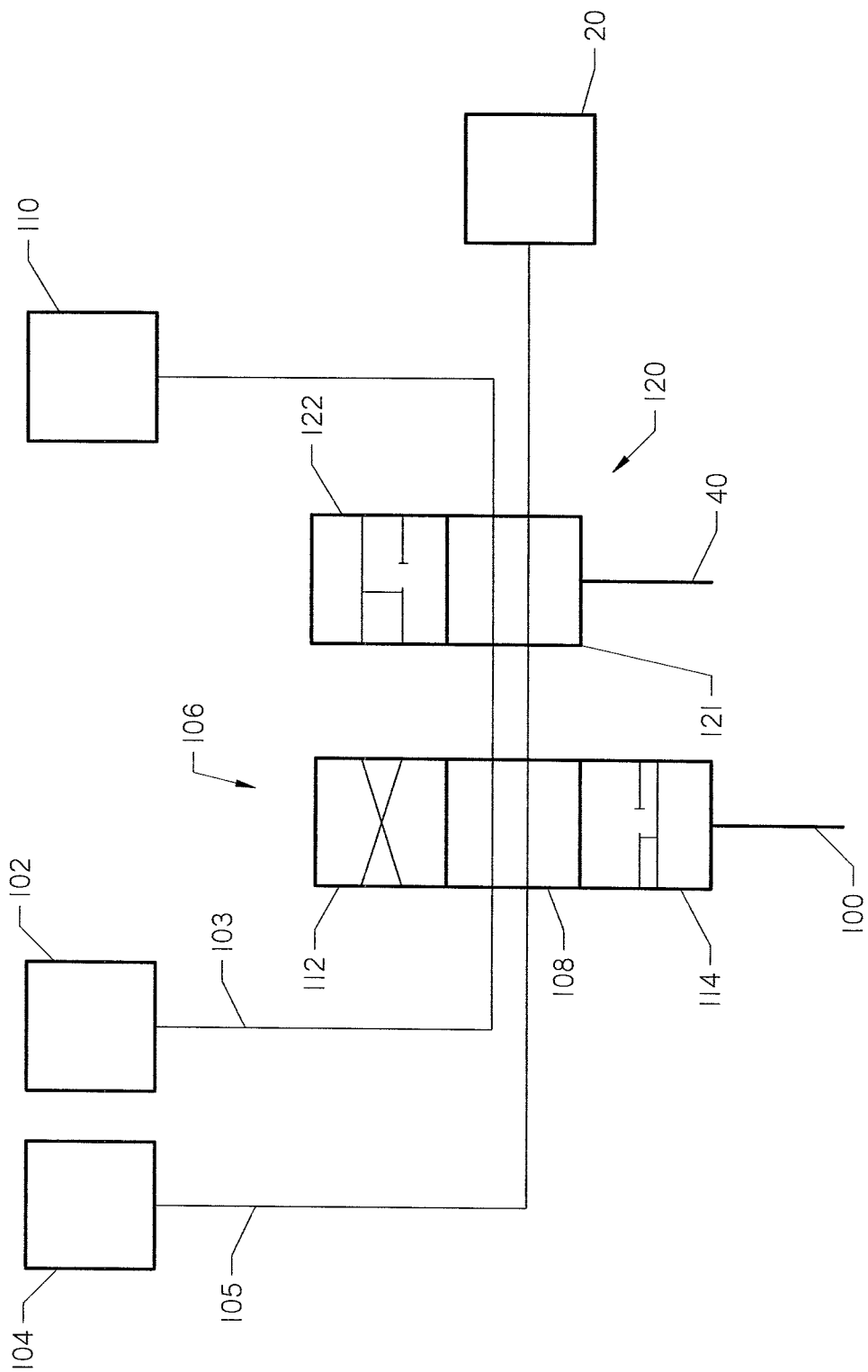
FIG. 7 is a schematic of a hydraulic control for a work machine wherein a low-flow operating condition is chosen and an attachment in an operating condition.
Figure 8:
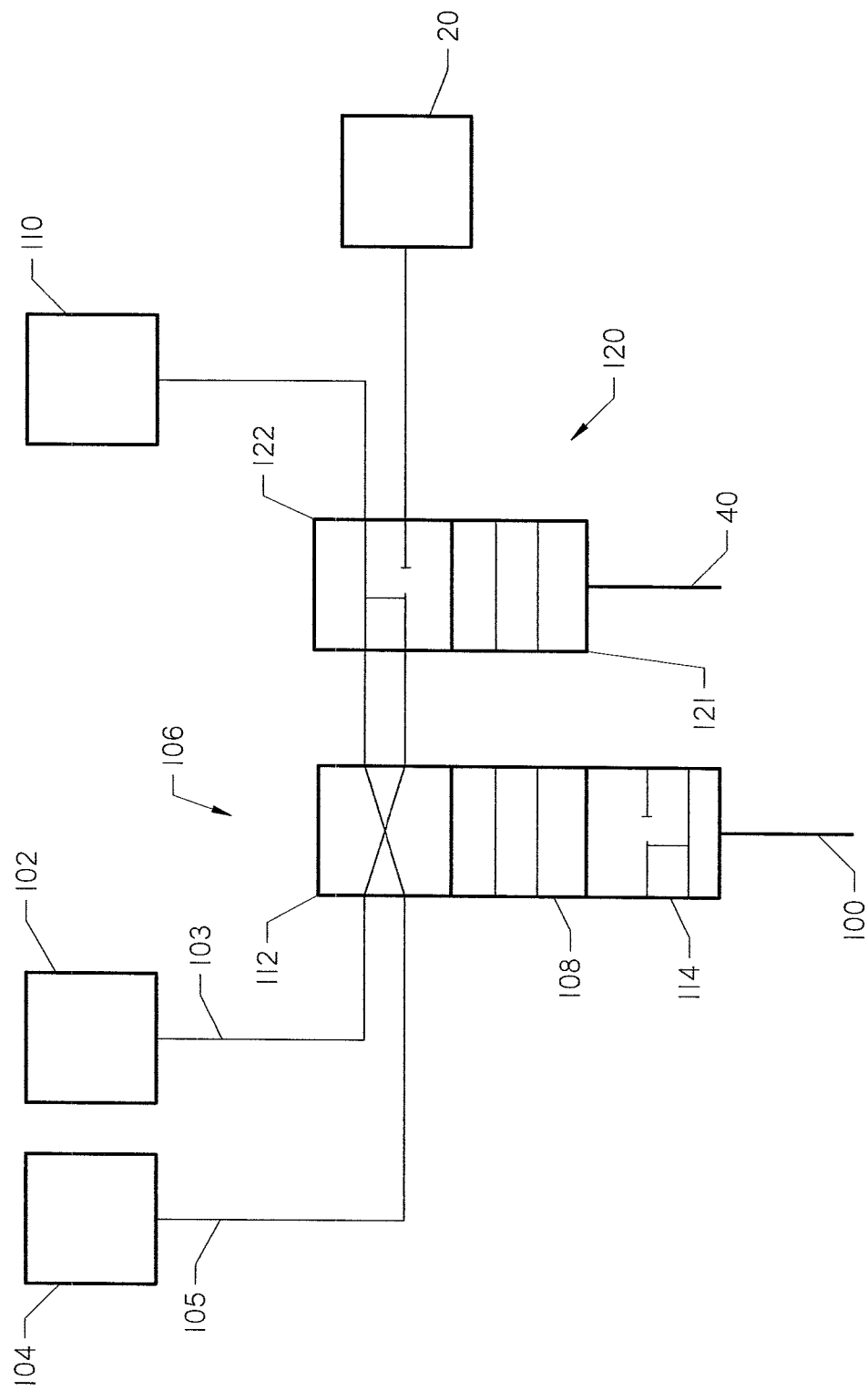
FIG. 8 is the schematic of FIG. 7 with a medium-flow operating condition chosen and the attachment in a neutral condition.
Figure 9:
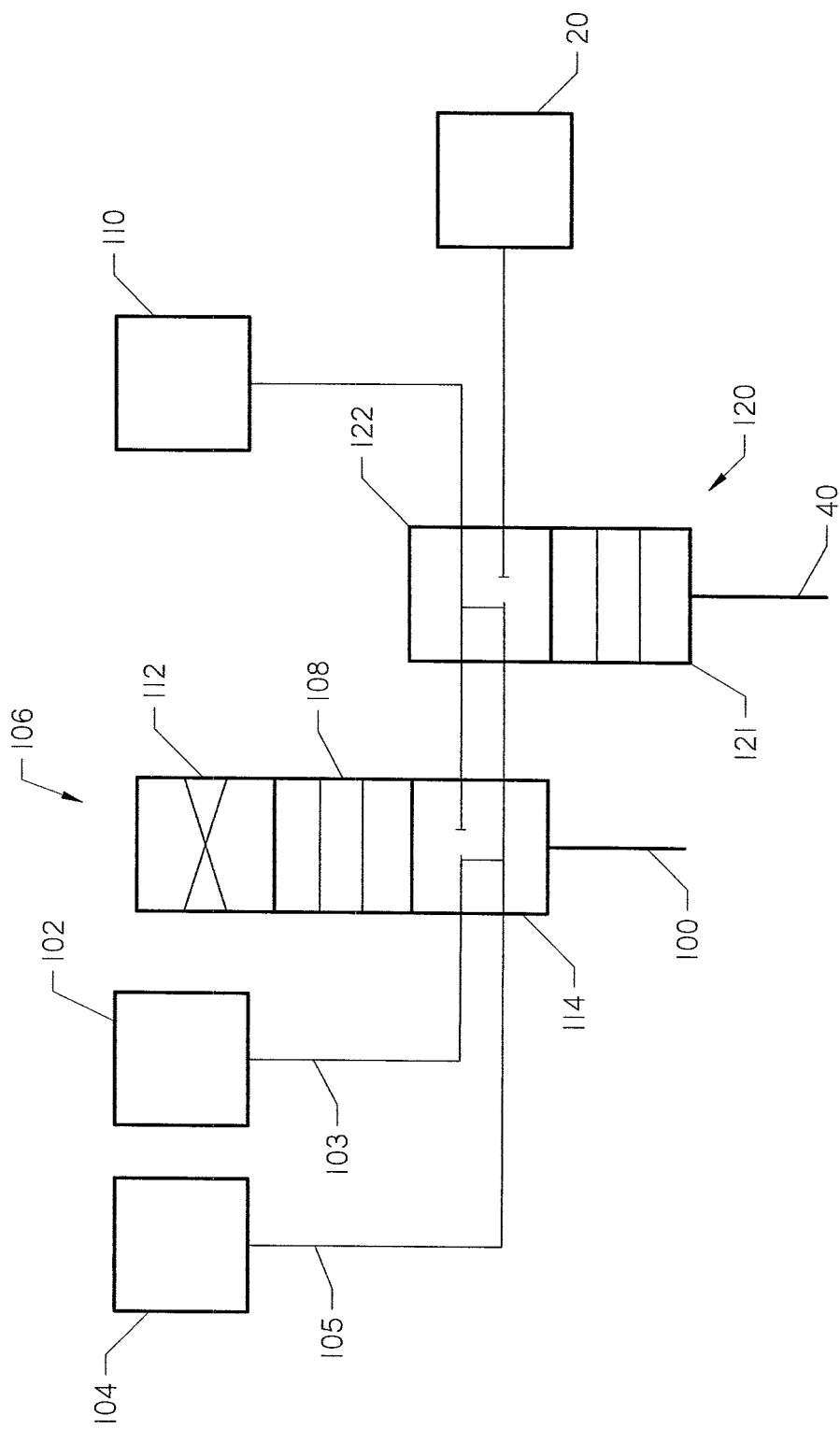
FIG. 9 is the schematic of FIG. 7 with a high-flow operating condition chosen and the attachment in a neutral condition.

With reference now to FIGS. 7-9, a hydraulic flow scheme is shown. The work machine 10 comprises a high flow pump 102 and a low flow pump 104. Hydraulic fluid from high flow pump 102 enters high flow line 103. Hydraulic fluid from low flow pump 104 enters low flow line 105. The hydraulic flow lever 100 (FIG. 6) or flow switch 250 (FIG.

10) may be moved to actuate a three-way valve 106 to any selected one of low, medium, and high flow conditions.

In FIG. 7, the valve 106 is in "low flow" condition shown by section 108. When flow lines 103, 105 are aligned with section 108, the valve 106 is in a low flow state. In the low flow state, the valve allows delivery of fluid from the low power pump to the attachment 20, while the high power pump fluid is returned to a fluid reservoir 110.

In FIG. 8, section 112 is aligned with flow lines 103, 105. In this condition, the valve 106 is in a "medium-flow" state. The valve 106 allows delivery of fluid from the high power pump 102, but not the low power pump 104, to the attachment 20.

In FIG. 9, flow lines 103, 105 are aligned with section 114. In this condition, the valve 106 is in a "high-flow" condition. The valve 106 allows delivery of fluid from both pumps 102, 104 to the attachment 20.

The work machine 10 also comprises a cut-off valve 120 controlled by the operation lever 40 (FIG. 6) or hydraulic control switches 240 (FIG. The cut-off valve 120 comprises a first section 121 and a second section 122. As shown in FIG. 7, flow lines 103, 105 are aligned with first section 121. In this condition, whichever flow is chosen, the three-way valve 106 is aligned with the attachment 20 and flow is allowed to power operation of the attachment. Thus, the condition of cut-off valve 120 in FIG. 7 is indicative of actuation of the control lever 40 or hydraulic control switch 240.

As shown in FIGS. 8 and 9, when the operation lever 40 is in neutral, the cut-off valve 120 aligns flow lines 103, 105 with second section 122. In this condition, the hydraulic fluid is directed to the fluid reservoir 110 and not to the attachment 20. Thus, irrespective of the condition of the three-way valve 106, the cut-off valve 120 may cause the attachment to become depowered. This may occur when the operator 18 is not holding the operation lever 40, or, for example, when the signal has been sent, releasing the detent of the operation lever.

The work machine 10 disclosed herein provides an operator presence control for operation of an attachment 20. In operation, an operator 14 stands on the platform 12 and operates the work machine 10 using the control panel 16. When operation of the attachment 20 is desired, the operator 14 moves the operation lever 40 or hydraulic control switch 240 under hand pressure into an actuated position. When operation is not desired, the operator 14 releases the lever 40 or hydraulic control switches 240, which biases to a neutral position.

With the operation lever 40 or hydraulic control switches 240 actuated, the operator may elect to restrict the return of the lever 40 to neutral, allowing operation of the attachment 20 without hand pressure on a lever or switch. By actuating a lock switch 42, 242, the attachment continues operation with the lever 40 or hydraulic control switch 240 not being held. With the lever 40 restricted, the operator 14 may operate other controls 44 of the work machine 10 with power to the attachment 20 maintained without actively holding the lever 40 in place.

Such a mode of operation may be desired when the operator 14 is on the platform 12, away from moving parts of the attachment 20. However, when the operator 14 leaves the platform, operation of the attachment 20 may pose a hazard. Thus, the platform 12 is moved from a second position to a first position by extension of the spring 62 when the weight of the operator 14 is removed from the platform. This moves a tab 66 to actuate the detection switch 50. The filter 52 detects whether a predetermined time has elapsed after actuation of the detection switch.

If the predetermined time elapses, a signal is sent by the release mechanism 32 to stop the effect of the lock switch 42, 242. This allows the operation lever 40 to return to neutral, or the effect of the hydraulic control switch 240 to be terminated. Thereafter, operation of the attachment 20 ceases.

If the predetermined time does not elapse before the actuation of the detection switch 50 ceases, the filter 52 prevents the release mechanism from sending the signal, and the lever 40 or hydraulic control switches 240 remain active.

One of ordinary skill in the art will appreciate that modifications may be made to the invention described herein without departing from the spirit of the present invention. For example, hydraulic control schemes are discussed herein. An electric motor may alternatively be used to provide power directly to the attachment when the operation lever is in the first position. In such a configuration, the cut-off valve 120 may be replaced with an electric bypass to shut off current to the attachment 20. Such an electric bypass may be actuated using the same system disclosed herein for use with hydraulic control.

The invention claimed is:

1. A work machine comprising:
   a chassis;
   a work attachment disposed on a first end of the chassis; and
   a work machine control system comprising:
      a control member movable from a first position to a second position such that moving the control member into the second position actuates the work attachment;
      a lock having a first condition and a second condition, wherein the lock allows the control member to freely return to the first position when in the first condition, and wherein the lock maintains the actuation of the work attachment caused by the control member when the lock is in the second condition;
      a release mechanism configured to place the lock in the first condition; and
      a platform disposed on a second end of the chassis movable from a first platform position to a second platform position, wherein the platform contacts the release mechanism in the first platform position and does not contact the release mechanism in the second platform position; and
   wherein the release mechanism places the lock in the first condition when the platform is in the first platform position.

2. The work machine of claim 1 wherein the work attachment comprises a trencher boom.

3. The work machine of claim 1 wherein the platform comprises a spring to bias the platform in the first platform position.

4. The work machine of claim 1 in which the control member is a lever.

5. The work machine of claim 4 wherein the lever is biased to the second position.

6. The work machine of claim 5 wherein the lever is in detent when the lock is in the second condition.

7. The work machine of claim 1 in which the control member is a switch.

8. The work machine of claim 7 wherein switch returns to the first position without ceasing actuation of the work attachment when the lock is in the second condition.

9. The work machine of claim 1 wherein the release mechanism generates a signal when the platform is in the first platform position such that the signal causes the release mechanism to place the lock in the first condition.

10. The work machine of claim 9 further comprising a filter configured to cancel transmission of the signal unless the platform has been in the first platform position for a predetermined time.

11. The work machine of claim 10 wherein the predetermined time is two seconds.

12. A work machine comprising:
a chassis;
a work attachment disposed on a first end of the chassis;
a platform disposed on a second end of the chassis movable from a second position to a first position;
a hydraulic power source;
a valve operable in a first mode wherein hydraulic power from the hydraulic power source is provided to the work attachment and in a second mode wherein hydraulic power is not provided to the work attachment;
a control for toggling the valve from the first mode to the second mode wherein the control is biased to maintain the valve in the second mode unless overridden;
a lock that overrides the control bias such that the valve is in the first mode; and
a release mechanism that releases the lock when the platform is in the first position.

13. The work machine of claim 12 further comprising a filter for cancelling the release of the lock unless the platform has been in the first position for a predetermined time.

14. The work machine of claim 12 wherein the hydraulic power source comprises:
a first hydraulic pump having a first power level; and
a second hydraulic pump having a second power level;
wherein the second power level is different than the first power level.

15. The work machine of claim 14 further comprising a three way valve operable in three modes, wherein the first mode provides only power from the first hydraulic pump to the attachment, the second mode provides only power from the second hydraulic pump to the attachment, and the third mode provides power from both the first hydraulic pump and second hydraulic pump to the attachment.

16. The work machine of claim 12 in which the control is a lever.

17. The work machine of claim 16 in which the lock physically detents the lever to override the control bias.

18. The work machine of claim 12 in which the control is a switch.

19. The work machine of claim 18 in which the lock maintains a signal from the switch to the valve to override the control bias and maintain the valve in the first mode.

* * * * *